(12) United States Patent
Grumbine et al.

(10) Patent No.: US 8,960,177 B2
(45) Date of Patent: Feb. 24, 2015

(54) WIRESAW CUTTING METHOD

(75) Inventors: Steven Grumbine, Aurora, IL (US);
Nevin Naguib Sant, Aurora, IL (US)

(73) Assignee: Cabot Microelectronics Corporation,
Aurora, IL (US)

( * ) Notice: Subject to any disclaimer, the term of this patent is extended or adjusted under 35 U.S.C. 154(b) by 900 days.

(21) Appl. No.: 13/139,017

(22) PCT Filed: Dec. 21, 2009

(86) PCT No.: PCT/US2009/068926
§ 371 (c)(1),
(2), (4) Date: Aug. 26, 2011

(87) PCT Pub. No.: WO2010/071873
PCT Pub. Date: Jun. 24, 2010

(65) Prior Publication Data
US 2011/0303210 A1 Dec. 15, 2011

Related U.S. Application Data

(60) Provisional application No. 61/203,142, filed on Dec. 20, 2008.

(51) Int. Cl.
*B28D 1/08* (2006.01)
*B28D 5/04* (2006.01)
*B28D 5/00* (2006.01)
*C09K 3/14* (2006.01)

(52) U.S. Cl.
CPC ............... *B28D 5/045* (2013.01); *B28D 5/007* (2013.01); *B28D 5/0076* (2013.01); *C09K 3/1463* (2013.01)

USPC .................. 125/21; 125/16.01; 125/16.02

(58) Field of Classification Search
CPC ............ B28D 5/045; B28D 5/61; B28D 5/18; B28D 7/02; B28D 1/08; B23D 61/185; B24D 5/123
USPC ........................... 125/21, 16.01, 16.02
See application file for complete search history.

(56) References Cited

U.S. PATENT DOCUMENTS

| | | | | | |
|---|---|---|---|---|---|
| 2,999,064 | A | * | 9/1961 | Sluhan | 508/194 |
| 3,618,707 | A | * | 11/1971 | Sluhan | 184/109 |
| 5,937,844 | A | * | 8/1999 | Kiuchi et al. | 125/16.02 |
| 6,001,265 | A | * | 12/1999 | Toyama et al. | 210/712 |
| 6,053,158 | A | * | 4/2000 | Miyata et al. | 125/21 |
| 6,186,864 | B1 | * | 2/2001 | Fisher et al. | 451/6 |
| 6,234,160 | B1 | * | 5/2001 | Nagatsuka et al. | 125/16.02 |
| 6,422,067 | B1 | * | 7/2002 | Oishi et al. | 73/54.28 |

(Continued)

FOREIGN PATENT DOCUMENTS

| | | | | |
|---|---|---|---|---|
| CA | 2002813 | C | * | 7/2000 |
| GB | EPA 0 369 692 | | * | 5/1990 |

(Continued)

*Primary Examiner* — George Nguyen
(74) *Attorney, Agent, or Firm* — Thomas E Omholt; Robert J Ross; Arlene Hornilla

(57) ABSTRACT

The present invention provides a wiresaw cutting method comprising cutting a workpiece with a wiresaw while applying an aqueous cutting fluid to the wiresaw from a recirculating reservoir of cutting fluid, monitoring at least one of a chemical property, a physical property, or both, and adjusting the chemical composition of the cutting fluid while cutting the workpiece to maintain the property being monitored. The present invention additionally provides an apparatus to perform the inventive method.

15 Claims, 1 Drawing Sheet

(56) References Cited

U.S. PATENT DOCUMENTS

| | | | |
|---|---|---|---|
| 6,715,318 B2* | 4/2004 | Mitani et al. | 65/30.1 |
| 7,195,542 B2* | 3/2007 | Hammer et al. | 451/8 |
| 7,267,604 B2* | 9/2007 | Yoshizawa et al. | 451/41 |
| 2002/0168923 A1* | 11/2002 | Kaufman et al. | 451/36 |
| 2002/0174861 A1* | 11/2002 | Lundt et al. | 125/21 |
| 2003/0032366 A1* | 2/2003 | Cerni | 451/5 |
| 2005/0009448 A1* | 1/2005 | Misra et al. | 451/5 |
| 2008/0173293 A1* | 7/2008 | Baratta | 125/15 |
| 2011/0017230 A1* | 1/2011 | Erk et al. | 134/1 |
| 2012/0156123 A1* | 6/2012 | Hidaka et al. | 423/348 |

FOREIGN PATENT DOCUMENTS

| | | | |
|---|---|---|---|
| JP | 2000-141362 | * | 5/2000 |
| JP | 2006-88455 | * | 4/2006 |

* cited by examiner

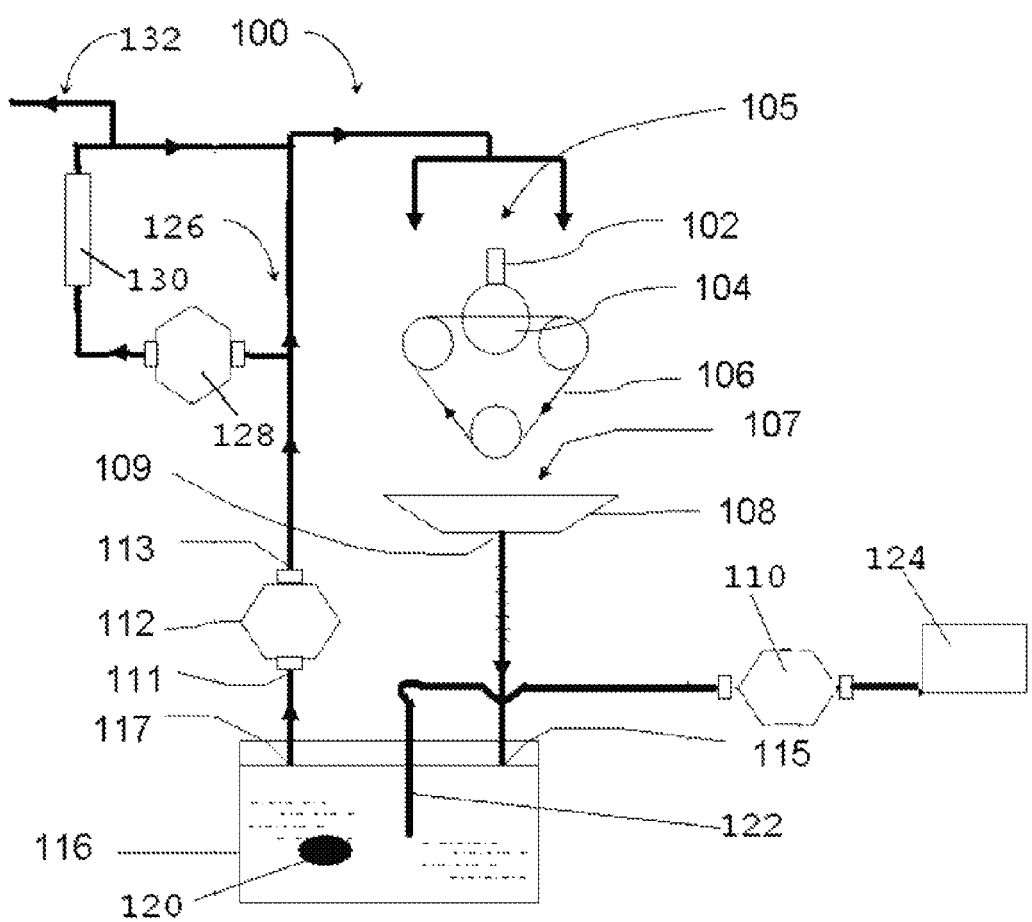

WIRESAW CUTTING METHOD

CROSS-REFERENCE TO RELATED APPLICATIONS

This application claims the benefit of U.S. Provisional Application for Patent Ser. No. 61/203,142, filed on Dec. 20, 2008, which is incorporated herein by reference.

FIELD OF THE INVENTION

This invention relates to wiresaw cutting processes. In particular this invention relates to a wiresaw cutting process utilizing an aqueous cutting fluid and involving adjusting the chemical composition of the cutting fluid during the cutting process.

BACKGROUND OF THE INVENTION

Wiresaw cutting is the dominant method for slicing ingots into thin wafers for use in the integrated circuits and photovoltaic device (PV) industries. This method is also commonly used for wafering substrates of other materials, such as sapphire, silicon carbide, or ceramic substrates. A wiresaw typically has a web of fine metal wires, or a wireweb, where the individual wires have a diameter around 0.15 mm and are arranged parallel to each other, at a distance of 0.1 to 1.0 mm, through a series of spools, pulleys and wire guides. Slicing, or cutting, is accomplished by contacting the workpiece (e.g. a silicon ingot) with a moving wire to which an abrasive cutting fluid cutting fluid has been applied.

Conventional wiresaw abrasive slurries typically comprise a carrier and abrasive particles combined by mixing in a ratio of about 1:1 by weight. The carrier is a liquid that provides lubrication and cooling, such as a mineral oil, kerosene, polyethylene glycol, polypropylene glycol or other polyalkylene glycols. The liquid carrier also holds the abrasive to the wire so that the abrasive can contact the workpiece. The abrasive is typically a hard material such as silicon carbide particles.

As noted above, the carrier can be a non-aqueous substance such as mineral oil, kerosene, or poly(alkylene glycol) materials such as a poly(ethylene glycol), or a poly(propylene glycol). Non-aqueous carriers can have several disadvantages, however. For example, non-aqueous carriers can have limited shelf-life because of colloidal instability, and also can exhibit poor heat transfer characteristics.

Aqueous carriers also can be used for wiresaw cutting processes; however, such carriers have certain known disadvantages, as well. For example, during the wiresaw cutting process, a portion of the material being cut is removed. This material, called kerf, gradually accumulates in the cutting fluid cutting fluid. In the process of wiresawing silicon and other water oxidizable substrates, the kerf can become oxidized by oxygen or water. In an aqueous cutting fluid, oxidation of a water oxidizable workpiece by water produces hydrogen. The presence of hydrogen in the cutting fluid composition can disrupt the cutting fluid distribution on the wire web and reduce the cutting performance of the wiresaw. The creation and potential accumulation of hydrogen can also be hazardous in a manufacturing environment.

Aqueous cutting fluids can contain multiple functional chemical components, such as surfactants, antifoaming agent, oxidizing agents, pH buffers, thickening agents, and the like, which can degrade due to conditions (e.g., shear, frictional heat, etc.) that can arise during the cutting of a workpiece. For example, some components may become adsorbed onto the kerf generated during the cutting operation, certain polymeric materials may break down into lower molecular mass forms due to shear experienced at the interface between the cutting wires and the workpiece, redox reactions between the workpiece (e.g., a silicon ingot) and a component of the cutting fluid; etc. Chemical changes in the cutting fluid that occur over time can lead to non-uniform physical properties of the cutting fluid during the cutting of a workpiece. This can reduce efficiency of the cutting process or lead to failure of the cutting wires, and the like.

It is desirable for the chemical composition and the physical properties of the cutting fluid (e.g., viscosity, pH, foam level, etc.) to remain relatively constant for the duration of the cutting process. This can be problematic when aqueous cutting fluids are utilized, due to the decomposition and instability issues described above. Accordingly, there is an ongoing need for methods of maintaining the integrity of the chemical composition and/or properties of an aqueous cutting fluid throughout a cutting operation. The present invention fulfills this need.

BRIEF SUMMARY OF THE INVENTION

The present invention provides a wiresaw cutting method comprising cutting a workpiece with a wiresaw while applying an aqueous cutting fluid to the wiresaw from a recirculating reservoir of cutting fluid, and adjusting the chemical composition of the cutting fluid while cutting the workpiece.

In a preferred embodiment, the present invention provides a wiresaw cutting method utilizing an aqueous cutting fluid. The method comprises cutting a workpiece with a wiresaw while applying an aqueous cutting fluid to the wiresaw from a recirculating reservoir of cutting fluid, monitoring a chemical and/or physical property of the cutting fluid while cutting the workpiece, and adjusting the chemical composition of the cutting fluid so as to maintain the chemical and/or physical property being monitored within predetermined limits or specifications.

In another preferred embodiment, the present invention provides a wiresaw cutting apparatus having a mount and support head adapted to hold a workpiece. The wiresaw is positioned relative to the mount and support head such that the workpiece can be brought into contact with the wiresaw when in operation. The apparatus has an application region for applying a wiresaw cutting fluid to the wiresaw from a recirculating cutting fluid dispensing system. The application region is positioned and adapted to deliver a cutting fluid to the wiresaw. The recirculating cutting fluid dispensing system defines a cutting fluid flow pathway. The apparatus has a wiresaw cutting fluid outlet region adapted to direct cutting fluid off of the wiresaw and mounted workpiece and back into the recirculating cutting fluid dispensing system. The recirculating dispensing system also has a sampling line for obtaining samples of the cutting fluid during the cutting process for monitoring one or more chemical and/or physical property of the cutting fluid, or a sensor adapted to monitor one or more chemical and/or physical property of the cutting fluid, or a sampling line and a sensor. In addition, the apparatus has a chemical additive feed line adapted to introduce a chemical into the recirculating cutting fluid in response to the monitoring to adjust the chemical composition of the cutting fluid to maintain or restore the level of the property being monitored within predetermined limits.

BRIEF DESCRIPTION OF THE DRAWINGS

FIG. 1 schematically illustrates a wiresaw cutting apparatus useful in performing the methods of the present invention.
}

DETAILED DESCRIPTION OF THE INVENTION

The present invention provides a wiresaw cutting method comprising cutting a workpiece with a wiresaw while applying an aqueous cutting fluid to the wiresaw from a recirculating reservoir of cutting fluid, and adjusting the chemical composition of the cutting fluid while cutting the workpiece. Preferably, the method also comprises monitoring a chemical and/or a physical property of the cutting fluid while cutting the workpiece, and adjusting the chemical composition of the cutting fluid to maintain or restore the level of the chemical and/or the physical property being monitored within predetermined limits or specifications.

In the methods of the present invention, the step of adjusting the chemical composition can comprise adding to the recirculating cutting fluid a replenishing amount of at least one chemical component of the cutting fluid that has degraded or has been otherwise depleted from the composition during cutting of a workpiece. Alternatively, the step of adjusting the chemical composition can comprise adding a chemical to the cutting fluid that will maintain one or more chemical and/or physical property of the cutting fluid within the predetermined limits or will restore one or more properties of the fluid back within the predetermined limits. The amount of the chemical component to be added is selected based on indications from the monitoring of the cutting fluid (e.g., monitoring of a concentration or other property of a component, and/or monitoring of a bulk physical or chemical property of the fluid, such as viscosity, conductivity, particle size, surface tension, foam level, density or pH) so as to maintain the level of the property being monitored within the predetermined limits.

The chemical component or material selected to be added to the cutting fluid in the methods of the present invention can be any chemical of which the presence, concentration or integrity thereof can affect the efficiency or efficacy of the cutting process. Such chemicals include surfactants (e.g., a hydrophobic surfactant), which may be present, e.g., to improve lubrication of the wires, to improve access of other chemical components to the surface of the wires or the workpiece, or to control hydrogen release resulting from reduction of water by the workpiece (e.g., the reaction of silicon with water). Other chemical components that can be added include oxidizing agents (e.g., to control hydrogen generation); antifoaming agents to keep excessive foam from hampering the cutting process; corrosion inhibitors to prevent excessive corrosion of the cutting wires and/or the workpiece, as the case may be; thickening agents to maintain the viscosity of the cutting fluid at a suitable level; anti-drying agents to prevent the cutting fluid from drying on the cutting wires; abrasives; acids; bases; and the like.

Surfactants can be utilized to reduce hydrogen generation due to reaction of water with the workpiece. Typically, such surfactants are relatively hydrophobic nonionic surfactants having a hydrophilic-lipophilic balance (HLB) value of 18 or less; however, the surfactants can be present for any other purpose known in the art, and can include anionic, amphoteric, and cationic surfactants, in addition to nonionic surfactants. It is more preferred that the surfactant has a HLB of less than 13. The surfactant level can be directly monitored by a spectroscopic or any other suitable analytical method, or can be indirectly monitored based of a chemical or physical property of the cutting fluid, e.g., contact angle measurements, the rate of hydrogen generation, and the like.

Oxidizing agents can be monitored by direct chemical or spectroscopic methods, or indirectly by monitoring a physical or chemical property of the fluid that is correlated with oxidant level, e.g., hydrogen generation or electrochemical potential measurements.

Antifoaming agents can be used in the compositions of the present invention, including insoluble oils, poly(dimethylsiloxane) materials, organosilicon materials, and other silicones, fatty alcohol alkoxylates, certain alcohols, stearates and glycols. Foam generated during the wire saw cutting process can prevent the abrasive from properly contacting the wire and the workpiece, and foam can otherwise interfere with the free flow of the composition. Antifoaming agents can be added to reduce the amount of foam generated during the wire saw cutting process.

Thickening agents can be used in the compositions of the present invention, including polycaboxylates, poly(ethylene glycol) materials, and cellulose compounds such as hydroxypropylcellulose or hydroxyethylcellulose. Thickening agents can be added to increase the viscosity of the composition and to decrease hydrogen generation. Preferably, the thickening agent is a nonionic polymer, and preferably has a weight average molecular weight of greater than about 20,000 Daltons (Da), more preferably at least about 50,000 Da (e.g. 50,000 to 150,000 Da). Suitable nonionic polymer thickeners include cellulose compounds such as hydroxyethylcellulose, polyoxyalkylene compounds such as poly(ethylene glycol) compounds, ethylene oxide-propylene oxide copolymers, and the like.

Corrosion inhibitors can be included in the compositions of the present invention, if desired. Examples of commonly used corrosion inhibitors include phosphates, carboxylate polymers, amino compounds, and the like. Corrosion inhibitors can be added, for example, to decrease the corrosion of the wire and other parts of the cutting saw.

Anti-drying agents can be included in the compositions of the present invention, including, for example, glycerin, glycol derivative such as di(ethylene glycol), and multi-valet alcohols such as 1,6-hexanediol and pentaerythritol. Anti-drying agents can be added to ensure that the pulleys and moving parts on the cutting tool stay properly lubricated during the cutting process.

Abrasives can be included in the compositions of the present invention to aid in the cutting process. Examples of suitable abrasives include silicon carbide, boron nitride, boron carbide and diamond.

Preferably, various functional components of the compositions are added to the compositions as aqueous solutions or aqueous suspensions.

Acids can be added to the compositions of the present invention to adjust the composition pH. Suitable acids include mineral acids such as hydrochloric acid, sulfuric acid, phosphoric acid and nitric acid. Organic acids can also be used, including carboxylic acids such as acetic acid, citric acid, and succinic acid, organophosphonic acids, and organosulfonic acids.

Bases can be added to the compositions of the present invention to adjust the composition pH. Suitable bases include metal hydroxide compounds such as sodium hydroxide and potassium hydroxide, metal oxides such as magnesium oxide and calcium oxide, amines, carboxylic acid salts such as sodium acetate, and the like.

Viscosity can be monitored to ensure that the composition properly holds the abrasives to the cutting wire while at the same time flowing freely around the wiresaw and the workpiece. The viscosity of a composition may change after prolonged wiresaw cutting, and this change of viscosity can reduce the performance of the wire cutting process unless additives are added to the composition to increase, decrease, or maintain viscosity. Preferably, the viscosity of the cutting fluid is substantially maintained during the cutting process.

In addition, pH can be monitored to ensure that the cutting fluid is within the appropriate pH range for the workpiece being cut, or to prevent an undesired side reaction, such as hydrogen generation. If the cutting fluid is found to be undesirably basic, an acid can be added to the recirculating cutting fluid to bring the pH back into the desired range. Similarly, if the pH of the cutting fluid is found to be too acidic, a base can be added to the fluid.

The density or specific gravity of the fluid can be monitored to determine, e.g., whether the fluid is within the proper concentration range, and whether water should be added to reduce the concentration of the additives in the composition.

The percent solids of the cutting fluid can be monitored to determine whether the abrasive is present at the proper concentration. Alternatively, the solids level of the liquid phase of the fluid can be monitored to determine whether the levels of dissolved materials in the aqueous carrier are within the proper specifications.

Foam height of the cutting fluid can be monitored to determine if the level of antifoam components has decreased as a result of absorption that occurs during the wire saw cutting process.

Wire tension can be monitored to ensure that the tension is within proper specifications to reduce wire wear and breakage.

Cutting fluid temperature can be monitored to ensure that frictional heat created from the wire saw cutting process does not raise the temperature of the composition above proper specifications.

Hydrogen generation can be monitored to determine whether excessive hydrogen is being generated during the cutting process. A hydrogen suppressing material, such as an acid, a hydrophobic surfactant, or an oxidizing agent, can be added to the cutting fluid in response to the monitoring to suppress excessive hydrogen generation.

The chemical to be added to the cutting fluid to adjust the chemical composition can be added manually in response to the monitoring or can be added automatically by a pump or other dispenser controlled via a feedback signal from the monitoring device. In some embodiments, the chemical is added on a scheduled basis without direct monitoring of the chemical in the composition during the cutting process. This typically is done when prior experience or experimentation demonstrates the need for adding the chemical either continuously or in batches on a defined schedule during the cutting process, and/or when monitoring of the chemical concentration may be difficult or inconvenient. For example, a chemical may be continuously or regularly added to the cutting fluid without monitoring of the chemical when it has been determined that a chemical and/or physical property of the cutting fluid (e.g., viscosity, hydrogen generation rate, etc.) undesirably changes in a predictable manner during the cutting process, and the regular or continuous addition of the a selected chemical counteracts the undesirable change in the cutting fluid property of interest.

This invention also provides for a wiresaw cutting apparatus. The apparatus comprises a mount and support head adapted to hold a workpiece, a wiresaw positioned relative to the mount and support head such that the workpiece can be brought into contact with the wiresaw when in operation, an application region positioned and adapted for applying a cutting fluid to the wiresaw from a recirculating cutting fluid dispensing system, and a wiresaw cutting fluid outlet region adapted to direct cutting fluid off of the wiresaw and mounted workpiece and back into a cutting fluid flow pathway. The recirculating cutting fluid dispensing system defines the cutting fluid flow pathway, and comprises a monitoring probe or sampler device for monitoring a property of the cutting fluid or sampling the fluid for monitoring. The apparatus also includes a chemical feed line for adding a chemical to the recirculating cutting fluid in response to the monitoring.

When the wiresaw cutting apparatus is in operation, the recirculating cutting fluid dispensing system includes a flow of cutting fluid in the direction indicated by arrow heads in FIG. 1. Arrow heads on the schematic representation of the wiresaw indicate movement of the wiresaw. The direction of movement of the wiresaw may reverse during the operation of the wiresaw. The flow direction of cutting fluid typically does not reverse during operation of the wiresaw.

The flow rate in the recirculating cutting fluid dispensing system is typically in the range of about 2000 Kg/hr to about 8000 Kg/hr (e.g., about 3000 Kg/hr to 6000 Kg/hr). Depending on the specific embodiment, the flow rate through the magnetic separator can be 0% or greater (e.g., 10% or greater, 20% or greater, 30% or greater, 40% or greater, 50% or greater, 100% or greater, 200% or greater, 300% or greater, 400% or greater, or 500% or greater) of the recirculating cutting fluid dispensing system flow rate. Depending on the specific embodiment, the flow rate through the magnetic separator is typically 1000% or less (e.g., 900% or less, 800% or less, 700% or less, 600% or less, 500% or less, 90% or less, 80% or less, 70% or less, 60% or less, or 50% or less) of the recirculating cutting fluid dispensing system flow rate.

The recirculating cutting fluid dispensing system can also include a collector. A collector is typically a surface that conveys cutting fluid from the workpiece back into circulation within the recirculating cutting fluid dispensing system. For example, the collector can be a container comprising an open top positioned to collect cutting fluid flowing or dripping from the wiresaw and having an outlet or drain for the cutting fluid to flow out of. The outlet can be located on the bottom, the sides, or can comprise a tube or siphon dipped into collected cutting fluid from the top of the collector. The collector can be configured in many different ways. For example the collector can be funnel-shaped, cone-shaped, pyramidal, or a half spherical shell. The collector can also be one or more surfaces angled to direct cutting fluid to a cutting fluid tank within the recirculating cutting fluid dispensing system.

The recirculating cutting fluid dispensing system can include a cutting fluid tank and one or more pumps, if desired. A cutting fluid tank provides a reservoir for the cutting fluid and is typically situated upstream of a pump. The cutting fluid tank typically has a stirrer or agitator to help prevent settling of solid components of the cutting fluid during the operation of the tool or while the tool is idling.

The recirculating cutting fluid dispensing system may include a heat exchanger. The heat exchanger can be situated at any point in the recirculating cutting fluid dispensing system. The heat exchanger can also be in, around, or integrated with components such as the cutting fluid tank, the collector, the pump, and the like. A typical configuration is for the heat exchanger to be located as a separate recirculation system including a separate pump where the separate recirculation system exchanges cutting fluid within a cutting fluid tank. The heat exchanger can be used to cool or heat the cutting fluid. For example, heating the cutting fluid can be used to lower the viscosity of the cutting fluid if the viscosity is too high for proper operation of the wiresaw apparatus. Alternatively, for example, cooling the cutting fluid can be used to raise the viscosity of the cutting fluid if the viscosity is too low for proper operation of the wiresaw apparatus. The temperature of the cutting fluid can also affect the rates of decomposition of cutting fluid components.

The recirculating cutting fluid dispensing system may comprise one or more collectors, one or more cutting fluid tanks, one or more pumps and one or more heat exchanger or any combination thereof. The recirculating cutting fluid dispensing system may further comprise plumbing for conveying cutting fluid between the various components. The plumbing typically includes a structure that constricts flow to one dimension, such as a tube or pipe. Where gravity allows the cutting fluid to flow through the recirculating cutting fluid dispensing system, the plumbing may comprise a more open structure such as a trough. The plumbing may even comprise an opening in a tube that allows the cutting fluid to pour into another component of the recirculating cutting fluid dispensing system such as a cutting fluid tank. Alternatively, for example, the plumbing may consist of a trough in a portion of the recirculating cutting fluid dispensing system where the flow is horizontal.

When the wiresaw apparatus of the invention is in operation, a workpiece secured to a mount and support head, is pressed against a moving wiresaw while cutting fluid is supplied to the wiresaw. The wiresaw has two or more wire guide rollers, which have their axes arranged parallel to one another and around which a wire is guided one or more times. Typically, a wiresaw has three wire guide rollers and the wire is multiply guided around the wire guides creating a wire-web. Configurations having more than 3 wire guides can be used in the method of this invention. The wiresaw is moved by rotation of wire guide rollers which causes sections of wire to move in a longitudinal direction. The direction of movement can be changed during the operation or be in a constant direction. For example the direction can oscillate from one direction to the next during the cutting process.

The wire used in the wiresaw of this invention can be made of any suitable material, as is known in the art. Typically, the wire has a thickness of about 0.01 mm or more (e.g., 0.05 mm or more, 0.1 mm or more, or 0.15 mm or more). Typically, the wire has a thickness of about 0.5 mm or less (e.g., 0.4 mm or less, 0.3 mm or less, 0.25 mm or less, or 0.2 mm or less). Typically, the wire is made of hard drawn steel. Alternatively, the wire can be made of one or more alloys such as alloys containing Fe, Ni, Cr, Mo and/or W. Because the wire wears out during the cutting operation, the wear material is recirculated with and contaminates the cutting fluid in the recirculating cutting fluid dispensing system.

FIG. 1 shows an embodiment of an apparatus useful in the methods of the present invention. Recirculating cutting fluid dispensing system 100 defines a cutting fluid flow pathway. The recirculating cutting fluid dispensing system 100 applies an abrasive cutting fluid to the moving wiresaw 106 at application region 105 while the workpiece 104, held by the mount and support head 102, is cut. Cutting fluid flows off of wiresaw 106 and workpiece 104 and back into the recirculating cutting fluid dispensing system at wiresaw cutting fluid outlet region 107. The recirculating cutting fluid dispensing system 100 also includes a collector 108 which is positioned to collect used cutting fluid coming from wiresaw cutting fluid outlet region 107. Cutting fluid exits collector 108 at collector outlet 109 and flows into cutting fluid tank 116 at tank inlet 115. Cutting fluid flows out of tank 116 through tank outlet 117, and into cutting fluid pump 112 via pump inlet 111. Cutting fluid then flows out of cutting fluid pump 112 via pump outlet 113.

All or a portion of the cutting fluid can be diverted into cooling loop 126, if desired, to maintain the temperature of the cutting fluid being applied to the wiresaw within a desired temperature range. Cutting fluid is diverted into cooling loop 126 via cooling loop pump 128 into heat exchanger 130. The cutting fluid flows out of heat exchanger 130 and back into circulation within dispensing system 100. If desired, sampling/monitoring line 132 can intersect cooling loop 126 to obtain samples of the cutting fluid for ex si/u monitoring of a cutting fluid property, and/or for in situ monitoring of a cutting fluid property. Cutting fluid that is not diverted into cooling loop 126 flows directly onto wiresaw 106 and workpiece 104. If desired, a monitoring probe 120 can be positioned anywhere within the cutting fluid flow path to monitor a chemical and/or physical property of the cutting fluid during the cutting operation. Probe 120 can conveniently be positioned within cutting fluid tank 116, if desired. A feed line 122 can be positioned anywhere within the cutting fluid flow path to add a chemical to the cutting fluid in response to the monitoring. For example, feed line 122 can be positioned within tank 116, if desired. A chemical supply pump 110 can be attached to feed line 122 and can be used to add chemicals from a chemical supply tank 124 to the composition in accordance with the invention.

The following non-limiting example is provided to further illustrate certain aspects of the invention.

EXAMPLE 1

A polycrystalline silicon ingot having the dimensions 125 mm×125 mm×45 mm was cut with a Myer-Burger 261 wiresaw. The cutting process was performed using a cutting fluid containing about 50% silicon carbide, about 42% water, about 2% thickener, 6% anti-drying agent, about 20 ppm of a biocide preservative commercially available as KATHON® from the Rohm and Haas Company, and about 0.25% SUR-FYNOL® 420, an antifoam surfactant available from Air Products and Chemicals, Inc.; all percentages being on a weight basis.

During the cut the level of foam was visually monitored to keep the level below a monolayer of bubbles on top of the slurry. When about 45 mm of the ingot had been cut with the wiresaw, the amount of foam in the cutting solution was observed to have increased to an unacceptable level. Based upon this observation, an additional amount of SUR-FYNOL® 420 antifoam surfactant was added to the cutting fluid to bring the nominal concentration up to about 0.5% by weight. Upon the addition of the additional surfactant, the foam dissipated and the performance of the wiresaw was returned to an acceptable level.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wiresaw cutting method comprising,
   cutting a workpiece with a wiresaw while applying an aqueous cutting fluid to the wiresaw from a recirculating reservoir of cutting fluid;
   monitoring a chemical and/or a physical property of the cutting fluid while cutting the workpiece; and
   adjusting the chemical composition of the cutting fluid to maintain or restore the level of the property being monitored within predetermined limits.

2. The method of claim 1 wherein adjusting the chemical composition comprises adding to the cutting fluid a replenishing amount of at least one chemical component of the cutting fluid to restore the property being monitored back within the predetermined limits.

3. The method of claim 1 wherein adjusting the chemical composition comprises adding a chemical component of the cutting fluid in an amount sufficient to maintain the cutting rate and quality within predetermined limits.

4. The method of claim 3 wherein the chemical being added is selected from the group consisting of a hydrophobic surfactant, an oxidizing agent, an antifoaming agent, a thickening agent, a corrosion inhibitor, an anti-drying agent, an acid or a base.

5. The method of claim 4 wherein the chemical being added is an antifoaming agent, and the antifoaming agent comprises a silicone.

6. The method of claim 4 wherein the chemical being added is an antifoaming agent, and the antifoaming agent comprises a $C_8$-$C_{22}$ alcohol.

7. The method of claim 4 wherein the chemical being added is a thickening agent, and the thickening agent comprises a cellulose compound.

8. The method of claim 4 wherein the chemical being added is a thickening agent, and the thickening agent comprises an acrylate polymer.

9. The method of claim 4 wherein the chemical being added is a corrosion inhibitor and the corrosion inhibitor comprises an alkyl phosphate or an amino compound.

10. The method of claim 4 wherein the chemical being added is an anti-drying agent and the anti-drying agent comprises an alcohol.

11. The method of claim 4 wherein the chemical being added is an anti-drying agent and the anti-drying agent comprises a salt.

12. The method of claim 1 wherein the property being monitored is selected from the group consisting of viscosity, pH, density, foam height, wire tension, percent solids, hydrogen generation, the temperature of the cutting fluid, a chemical component of the cutting fluid, or an optical property of the aqueous carrier.

13. A wiresaw cutting apparatus comprising:
   a mount and support head adapted to hold a workpiece;
   a wiresaw positioned relative to the mount and support head such that the workpiece can be brought into contact with the wiresaw when in operation;
   an application region for applying a wiresaw cutting fluid to the wiresaw from a recirculating cutting fluid dispensing system, the application region being positioned and adapted to deliver a cutting fluid to the wiresaw, the recirculating cutting fluid dispensing system defining a cutting fluid flow pathway;
   a wiresaw cutting fluid outlet region adapted to direct cutting fluid off of the wiresaw and mounted workpiece and back into the recirculating cutting fluid dispensing system;
   the recirculating dispensing system comprising a sampling line for obtaining samples of the cutting fluid during the cutting process for monitoring one or more chemical and/or physical property of the cutting fluid, or a sensor adapted to monitor one or more chemical and/or physical property of the cutting fluid, or a sampling line and a sensor;
   and a chemical additive feed line adapted to introduce a chemical into the recirculating cutting fluid in response to the monitoring to adjust the chemical composition of the cutting fluid to maintain or restore the level of the property being monitored within predetermined limits.

14. The apparatus of claim 13 wherein the property being monitored is selected from the group consisting of viscosity, pH, density, foam height, wire tension, percent solids, hydrogen generation, the temperature of the cutting fluid, a chemical component of the cutting fluid, or an optical property of the aqueous carrier.

15. The apparatus of claim 13 wherein the chemical being introduced into the recirculating cutting fluid is selected from the group consisting of a hydrophobic surfactant, an oxidizing agent, an antifoaming agent, a thickening agent, a corrosion inhibitor, an anti-drying agent, an acid or a base.

* * * * *